United States Patent [19]

Nishihara et al.

[11] Patent Number: 4,903,317

[45] Date of Patent: Feb. 20, 1990

[54] IMAGE PROCESSING APPARATUS

[75] Inventors: Eitaro Nishihara, Ootawara; Zhixiong Wu; Yoshihiko Ogawa, both of Sapporo, all of Japan

[73] Assignee: Kabushiki Kaisha Toshiba, Kawasaki, Japan

[21] Appl. No.: 66,073

[22] Filed: Jun. 23, 1987

[30] Foreign Application Priority Data

| Jun. 24, 1986 | [JP] | Japan | 61-146059 |
| Jun. 24, 1986 | [JP] | Japan | 61-146060 |
| Jun. 24, 1986 | [JP] | Japan | 61-146061 |
| Aug. 12, 1986 | [JP] | Japan | 61-189174 |
| Nov. 14, 1986 | [JP] | Japan | 61-272366 |
| Nov. 14, 1986 | [JP] | Japan | 61-272367 |
| Nov. 21, 1986 | [JP] | Japan | 61-276644 |

[51] Int. Cl.$^4$ .............................................. G06K 9/00
[52] U.S. Cl. .................................. 382/56; 358/262.1; 358/426; 382/6
[58] Field of Search ................ 382/56, 6; 358/260, 358/262.1, 283, 426; 375/33

[56] References Cited

U.S. PATENT DOCUMENTS

| 4,124,870 | 11/1978 | Schatz et al. | 358/260 |
| 4,566,127 | 1/1986 | Sekiya et al. | 382/56 |
| 4,568,983 | 2/1986 | Bobick | 358/260 |
| 4,668,995 | 5/1987 | Chen et al. | 358/283 |
| 4,682,869 | 7/1987 | Itoh et al. | 358/260 |
| 4,776,029 | 10/1988 | Shimura | 382/56 |
| 4,797,741 | 1/1989 | Sato et al. | 382/56 |

Primary Examiner—Leo H. Boudreau
Attorney, Agent, or Firm—Finnegan, Henderson, Farabow, Garrett, and Dunner

[57] ABSTRACT

An image processing apparatus includes a memory for storing image data, a loss-compression circuit for loss-compressing the image data, an expansion circuit for expanding the loss-compressed image data, and a difference circuit for calculating a difference between the original image data of the image memory and the expanded image data of the expansion circuit. A lossless compression circuit lossless-compresses the difference image data obtained by the difference circuit. A multiplexer multiplexes the loss-compressed image data output from the loss-compression circuit, with the lossless-compressed difference data obtained by the lossless-compression circuit.

15 Claims, 19 Drawing Sheets

|     |     |     |     |    |    |
|----:|----:|----:|----:|---:|---:|
| 200 | 204 | 152 | 104 | 50 | 19 |
| 205 | 197 | 146 |  97 | 39 | 18 |
| 198 | 180 | 139 |  88 | 30 | 22 |
| 197 | 169 | 118 |  76 | 24 | 26 |
| 203 | 152 | 106 |  60 | 21 | 17 |
| 199 | 146 |  98 |  49 | 23 | 20 |

FIG. 3A

|    |    |    |    |    |    |
|---:|---:|---:|---:|---:|---:|
| 63 | 41 |  2 | -1 |  1 | -1 |
|  7 |  1 | -5 | -1 | -2 | -1 |
|  0 |  0 |  0 |  1 | -1 |  1 |
|  0 |  0 |  0 |  0 |  0 |  0 |
|  0 | -1 |  0 |  0 |  0 |  0 |
|  0 |  0 |  0 |  0 |  0 |  0 |

FIG. 3B

|     |     |     |     |    |    |
|----:|----:|----:|----:|---:|---:|
| 200 | 202 | 153 | 103 | 55 | 15 |
| 204 | 199 | 147 |  97 | 40 | 15 |
| 199 | 183 | 134 |  88 | 29 | 25 |
| 199 | 167 | 120 |  73 | 21 | 25 |
| 206 | 156 | 108 |  57 | 17 | 17 |
| 203 | 143 |  99 |  49 | 24 | 18 |

FIG. 3C

|    |    |    |    |    |    |
|---:|---:|---:|---:|---:|---:|
|  0 |  2 | -1 |  1 | -5 |  4 |
|  1 | -2 | -1 |  0 | -1 |  3 |
| -1 | -3 |  5 |  0 |  1 | -3 |
| -2 |  2 | -2 |  3 |  3 |  1 |
|  3 | -4 | -2 |  3 |  4 |  0 |
| -4 |  3 | -1 |  0 | -1 |  2 |

FIG. 3D

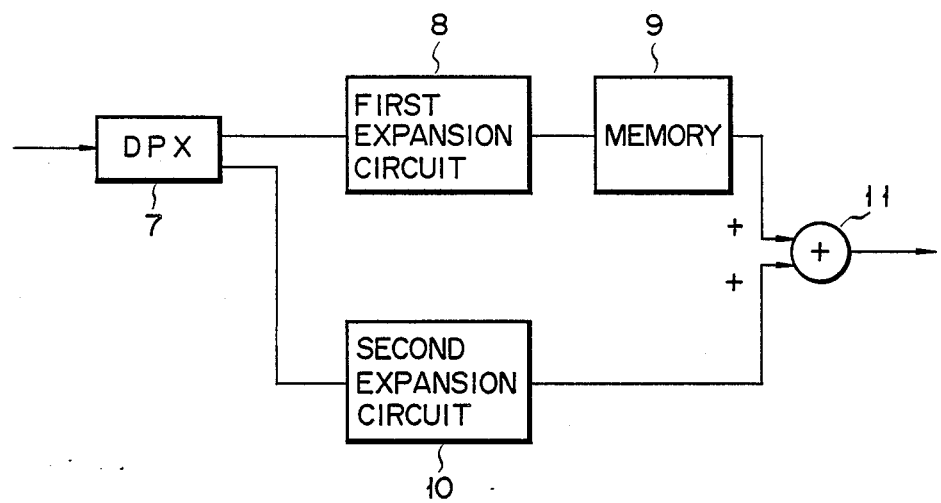
F I G. 4

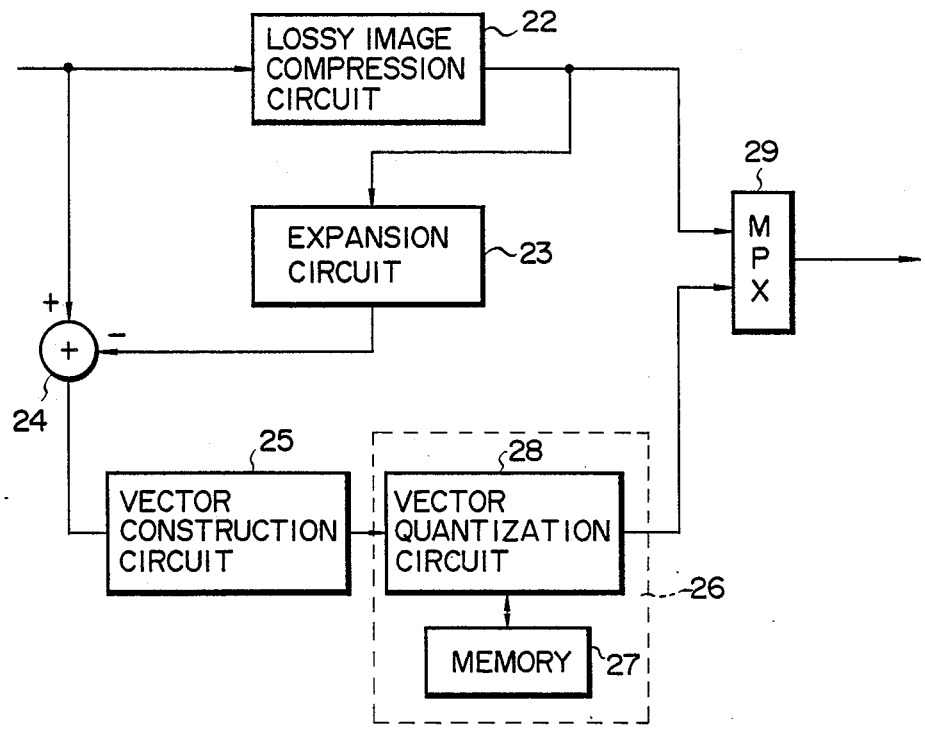
F I G. 6A
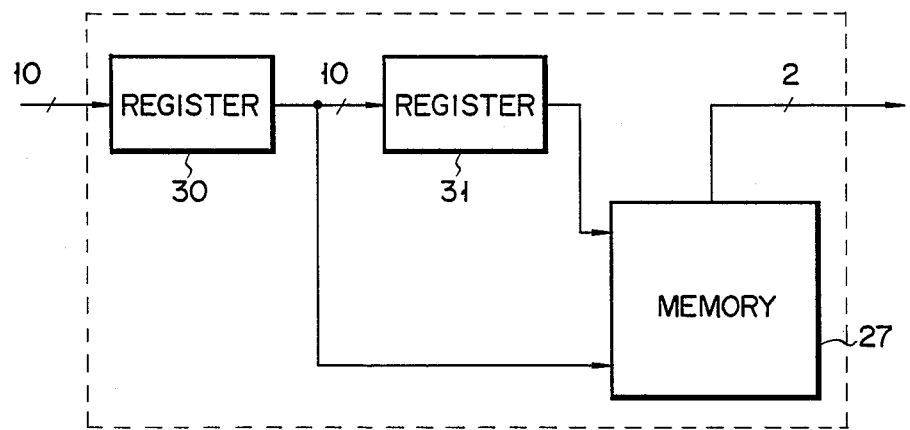
F I G. 6B

F I G. 7B

| CODE | 0 0 | 0 1 | 1 0 | 1 1 |
|---|---|---|---|---|
| X | 0 | 4 | -1.5 | 1 |
| Y | 0 | 6 | 2 | -3 |

F I G. 7C

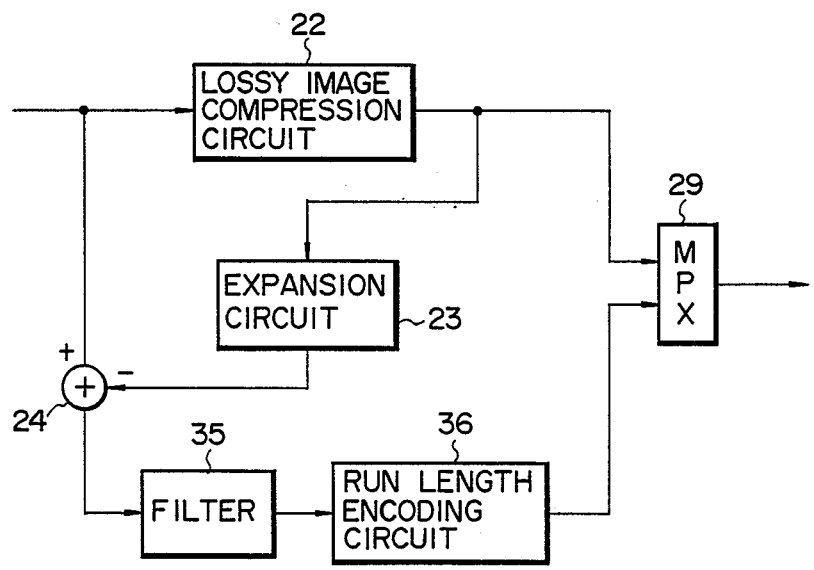
F I G. 8

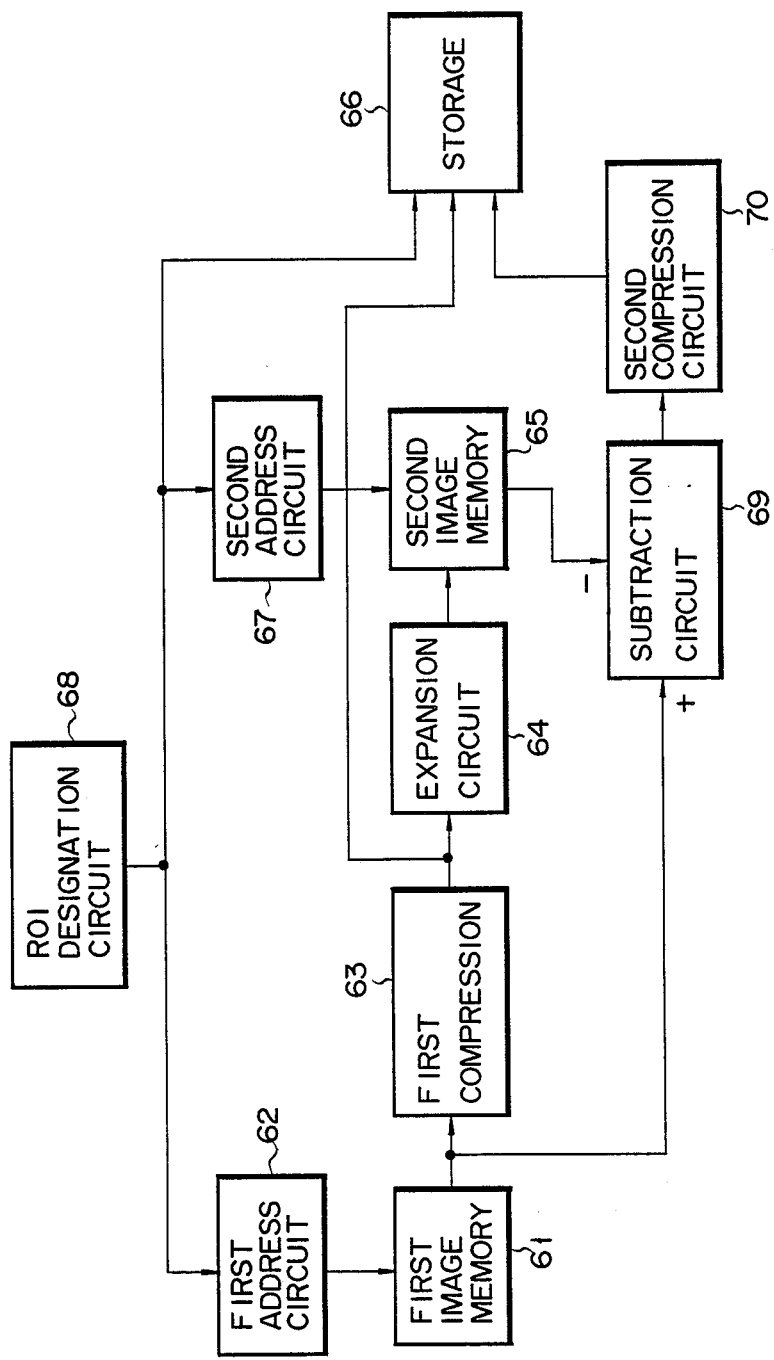
F I G. 9

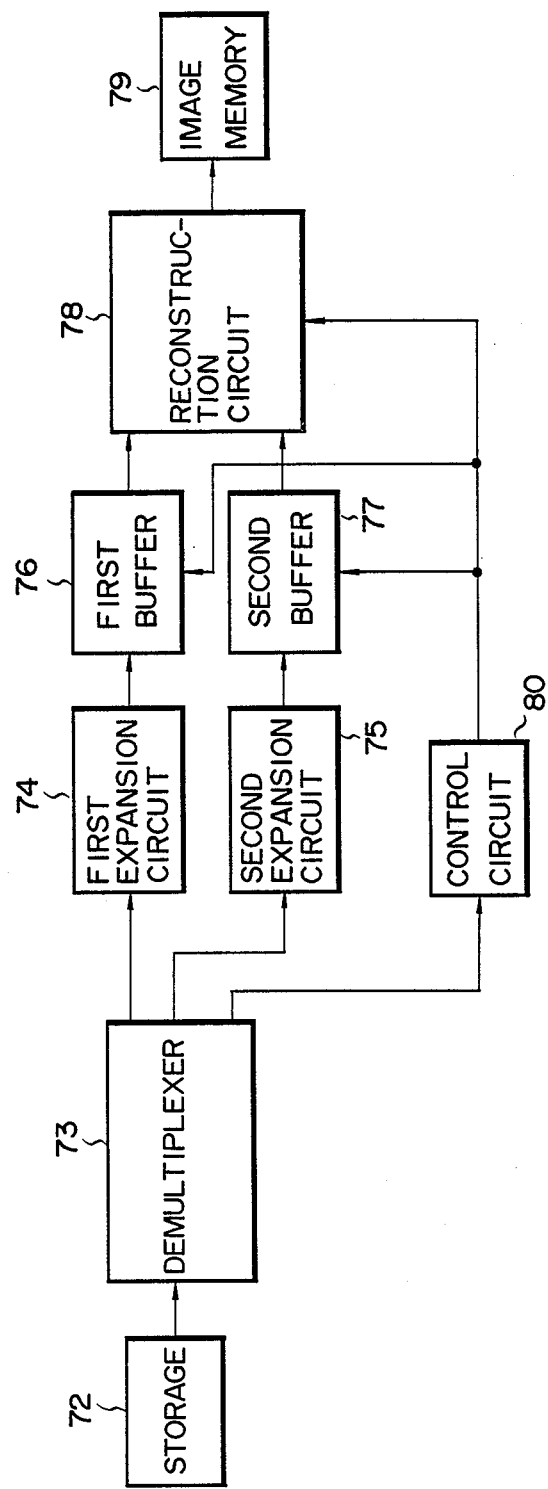
F I G. 10

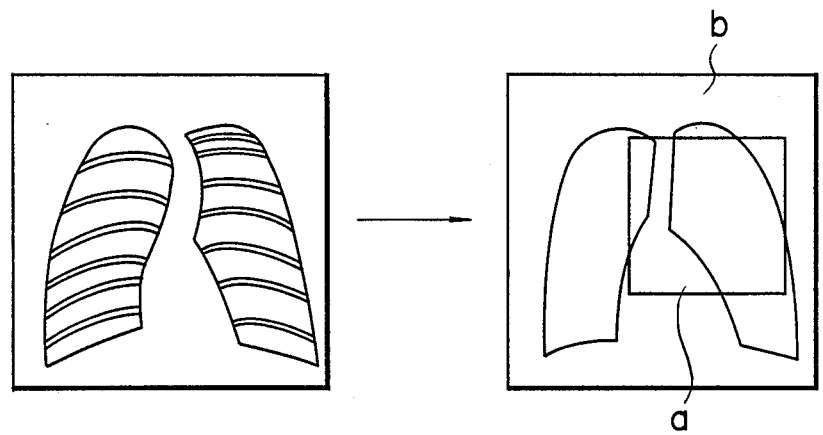
F I G. 11
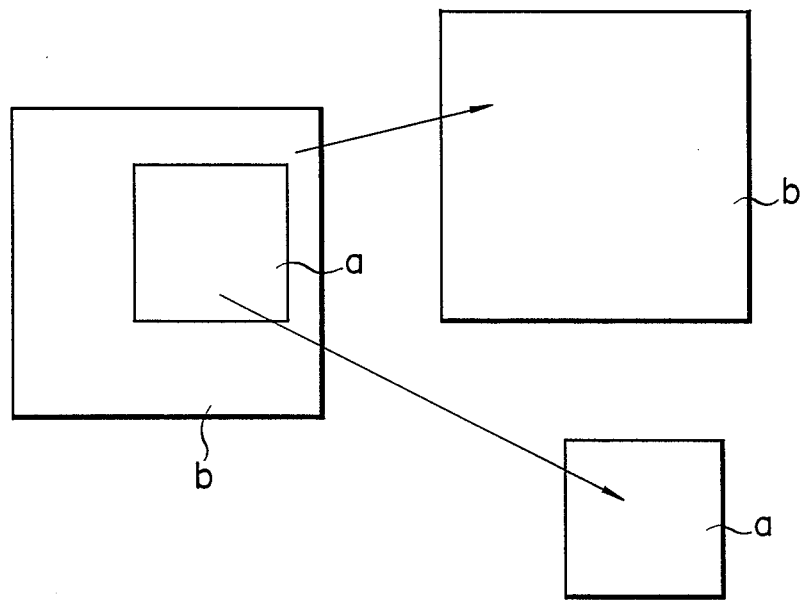
F I G. 12

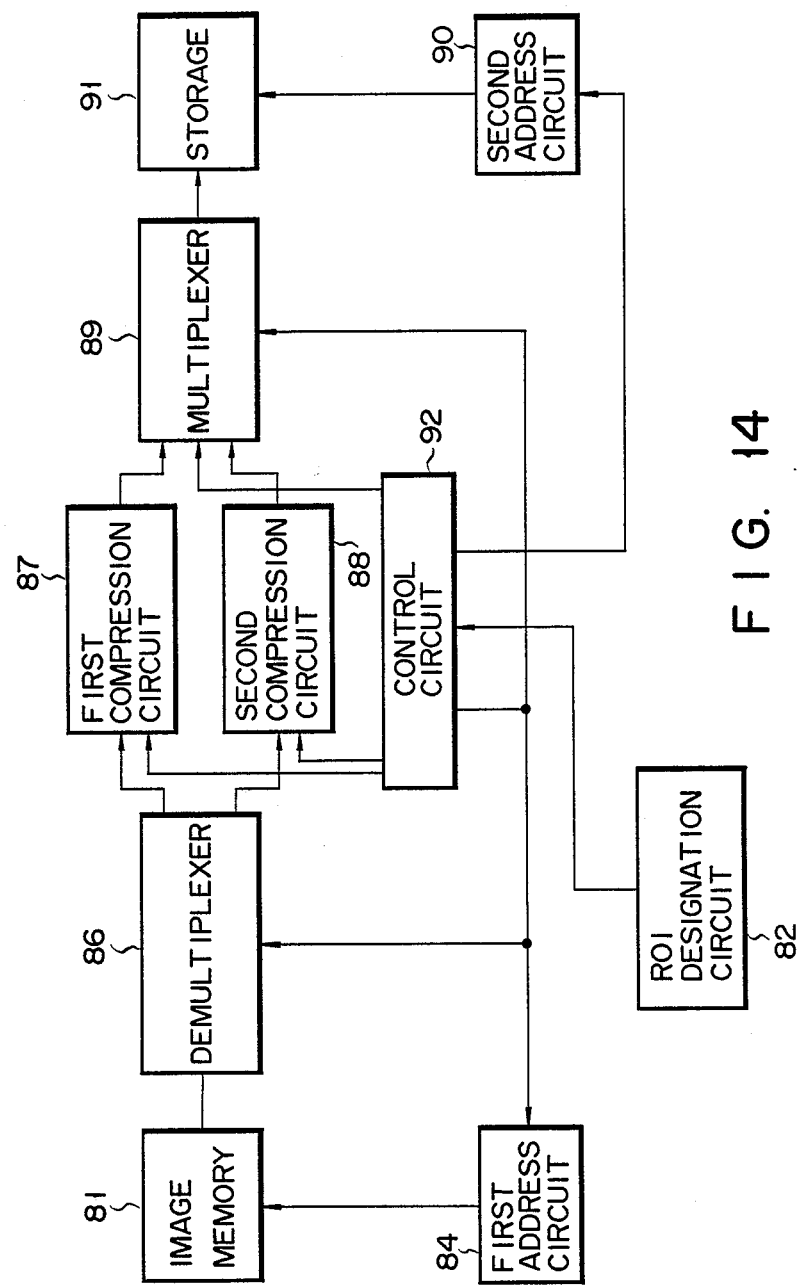
F I G. 14

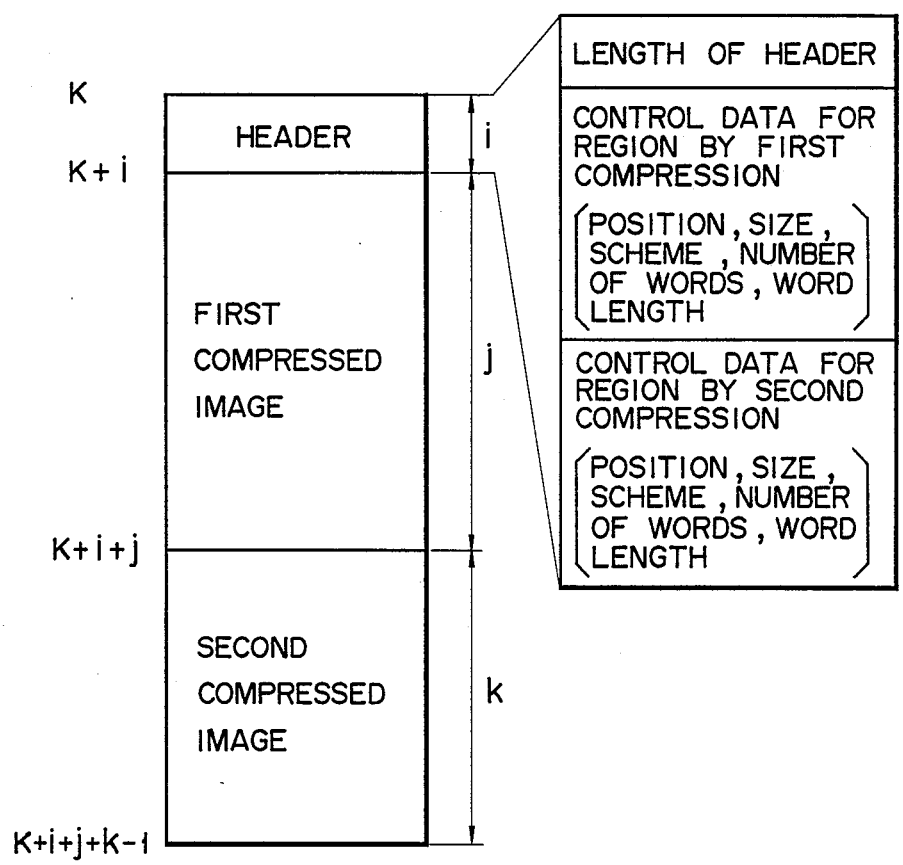
F I G. 15

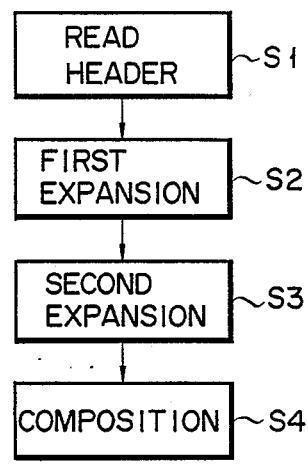
F I G. 18
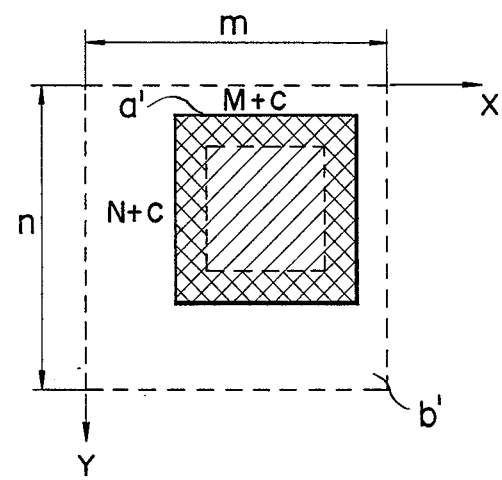
F I G. 19
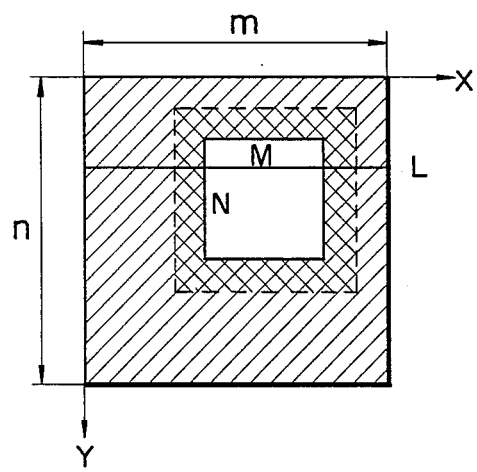
F I G. 20

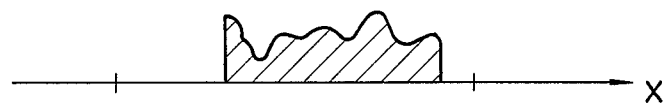
F I G. 21A
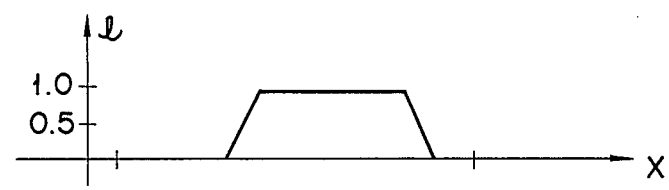
F I G. 21B
F I G. 21C

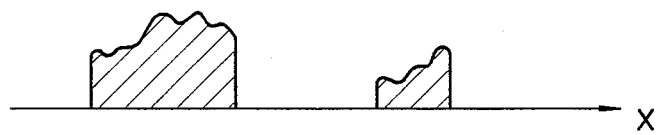
F I G. 22A
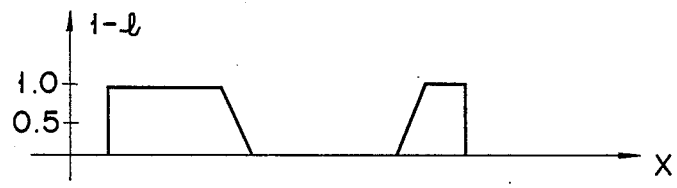
F I G. 22B
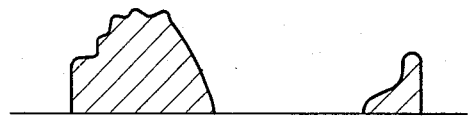
F I G. 22C
F I G. 22D

IMAGE PROCESSING APPARATUS

BACKGROUND OF THE INVENTION

The present invention relates to an image processing apparatus and, more particularly, to an image processing apparatus for compressing and expanding an image data.

When digital image data is exchanged through a communication line or is stored in a storage device, the data is compressed to reduce the load imposed on the communication line or the storage device. Image compression techniques utilized by the present invention include lossless compression and lossy compression. When lossless compression is used, the compressed image can be perfectly decoded to an original image by using a run-length recording technique or a compression technique for coding by use of the Huffman method, after redundant data is compressed by forecast encoding. In contrast to this, the lossy compression technique has a higher compression ratio than that of the lossless compression technique. However, this technique cannot perfectly decode the compressed image data to an original image, and the image quality is degraded in proportion to the compression ratio.

When the image processing apparatus is used for medical diagnosis, a very high quality image is required. Consequently, lossless compression, which involves no degradation, is the technique used in the field o medicine. For this reason, the compression ratio for the medical image cannot be greatly improved, and the storage used for storing the medical image cannot be reduced in storage capacity.

SUMMARY OF THE INVENTION

It is an object of the present invention to provide an image processing apparatus which can improve a compression ratio with a substantially less degradation of image quality.

The image processing apparatus according to the present invention comprises first compression means for compressing image data by means of the lossy compression technique, expansion means for expanding the image data compressed by the first compression means, difference means for obtaining difference image data between the expanded image data and an original image, and second compression means for compressing the output of the difference means.

When the compressed difference image data is expanded, there is almost no degradation in the quality of the image compressed by use of the lossless compression method. Furthermore, even if the image data is compressed by use of the lossy compression method, the compressed image can be decoded to one which is substantially free from degradation in quality.

BRIEF DESCRIPTION OF THE DRAWINGS

FIGS. 3A to 3D are formats of image contents, for explaining the operation of the embodiment;

FIG. 4 is a block diagram of an image expansion circuit;

FIG. 6A is a block diagram of an image processing apparatus according to still another embodiment of the present invention, which uses vector data;

FIG. 6B is a circuit diagram of a vector quantization circuit section used in the embodiment shown in FIG. 6A;

FIG. 7B is a view representing a code book;

FIG. 7C is a view representing a code table;

FIG. 8 is a block diagram of an image processing apparatus according to still another embodiment of the present invention, which uses a filter for removing noise components;

FIG. 9 is a block diagram of a compression processor of an image processing apparatus according to another embodiment of the present invention, which combines and processes lossless- and loss-compressed images;

FIG. 10 is a block diagram showing an expansion processor of the image processing apparatus shown in FIG. 8;

FIG. 11 is a view illustrating a medical image;

FIG. 12 is a view showing patterns for dividing the medical image shown in FIG. 11 into lossless- and loss-compressed images;

FIG. 14 is a block diagram of a compression processor of an image processing apparatus for realizing image processing, as shown in FIG. 13;

FIG. 15 shows a storage format of compressed image data;

FIG. 18 is a flow chart showing the operation of an expansion circuit as used in the embodiment shown in FIG. 16;

FIG. 19 is a view showing a pattern of a lossless compressed image;

FIG. 20 is a view showing a pattern of a loss-compressed image;

FIGS. 21A to 21C are charts showing waveforms of lossless-compressed image signals along line L of the pattern shown in FIG. 20; and FIGS. 22A to 22D are charts showing waveforms of loss-compressed image signals along line L of the pattern shown in FIG. 20.

DETAILED DESCRIPTION OF THE PREFERRED EMBODIMENT

Figure 1:
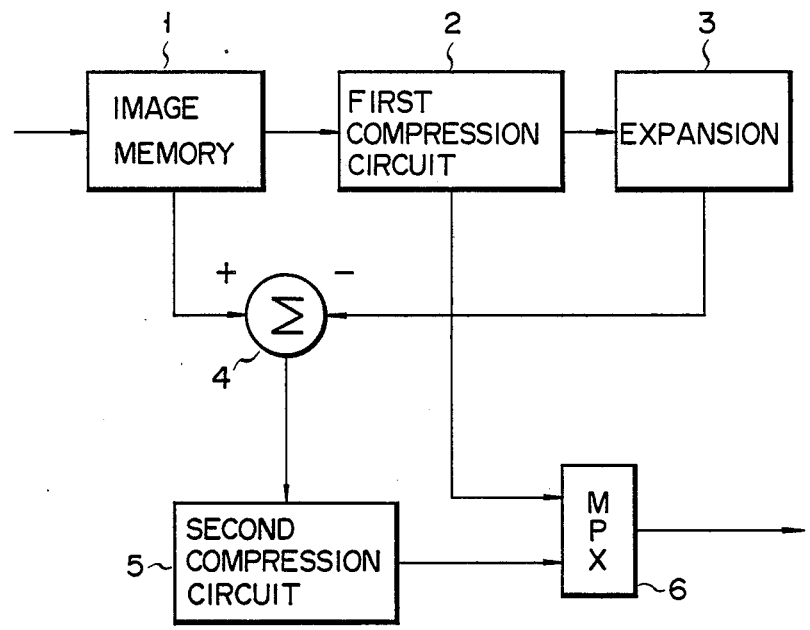
FIG. 1 is a block diagram showing an image processing apparatus according to an embodiment of the present invention.

Referring to FIG. 1, image memory 1 for storing image data obtained by signal-processing an image signal from an image sensing apparatus is connected to first compression circuit 2. An output from circuit 2 is connected to expansion circuit 3. First compression circuit 2 compresses image data by information lossy (irreversible) compression method and expansion circuit 3 expands loss-compressed image data so as to decode the data.

The outputs from image memory 1 and expansion circuit 3 are connected to difference circuit 4. Difference circuit 4 outputs difference image data between the non-compressed image data stored in image memory 1 and the image data expanded by expansion circuit 3. The output from difference circuit 4 is connected to second compression circuit 5. Second compression circuit 5 compresses the difference data by information loss-less (error-free) compression methods, and is output is connected to multiplexer 6 together with the output from circuit 2.

First compression circuit 2 comprises data transformation circuit 2a, quantization circuit 2b, and encoder 2c. Data transformation circuit 2a is connected to the output terminal of image memory 1, and performs 2-dimentional orthogonal transformation, such as cosine transformation or Fourier transformation of image data. Quantization circuit 2b fetches the output from transformation circuit 2a, and quantizes the transformed output data for every unit data length. Encoder 2c encodes the quantized data.

The two-dimensional cosine transformation is performed by circuit 2 as follows:

$$F = (u,v) = (2/N)^2 C(u) \cdot C(v) \times \left\{ \sum_{k=0}^{N-1} \cdot \sum_{j=0}^{N-1} f(j,k) \cos[U(j + 0.5)/N] \cdot \cos[v(k + 0.5)/N] \right\}$$

Quantization circuit 2b quantizes transformed image data by using a technique for uniformly or non-uniformly decreasing the number of quantization bits or a technique for assigning bits in accordance with a data volume of each word.

Expansion circuit 3 shown in FIG. 1 fetches the output from quantization circuit 2b, reconstructs the quantized data by performing inverse orthogonal transformation and outputs the lossy output to difference circuit 4. Difference circuit 4 calculates the difference between an original image stored in image memory 1 and the expanded image obtained from expansion circuit 3, and outputs the difference data to second compression circuit 5. Second compression circuit 5 lossless-compresses the difference data, and outputs the compressed output to multiplexer 6.

In this embodiment, if CT image data is stored in image memory 1, as shown in FIG. 3A, the image data in image memory 1 is compressed by information lossy methods in first compression circuit 2. Referring to FIG. 3A, values, e.g., 200, 204, 152, ..., represent densities of pixels of an image, and an original image is constituted by these pixels. When each image data representing a density is processed by data transformer 2a and then quantized by quantization circuit 2b of compression circuit 2, original image data shown in FIG. 3A is transformed and scaled into loss-compressed data in the format shown in FIG. 3B. The loss-compressed data is input to expansion circuit 3 to be expanded. Thus, the compressed data can be decoded to data in the format shown in FIG. 3C. The decoded image data and the original image data are input to difference circuit 4, thereby calculating a difference between both the image data shown in FIGS. 3A and 3C. The difference data is shown in FIG. 3D.

The difference data is input to second compression circuit 5, and is compressed by information lossless compression methods. The lossless-compressed difference data is input to multiplexer 6 together with the loss-compressed data from first compression circuit 2. Multiplexer 6 outputs multiplexed data of the encoded data from encoder 2c of circuit 2 and the difference data. The output data from multiplexer 6 is output to an expansion circuit apparatus of a receiver terminal through a transmission path (not shown) or stored in a storage. The expansion circuit apparatus is arranged as shown in FIG. 4. More specifically, two output terminals of demultiplexer 7 are respectively connected to first and second expansion circuits 8 and 10. The output terminal of first expansion circuit 8 is connected to memory 9. The output terminals of memory 9 and second expansion circuit 10 are connected to adder 11.

Demultiplexer 7 demultiplexes the multiplexed data into the encoded data (FIG. 3B) and the difference compressed data, and outputs these data to first and second expansion circuit 8 and 10, respectively. First expansion circuit 8 expands the encoded data from first compression circuit 2, and outputs the expanded data (FIG. 3C) to memory 9. Second expansion circuit 10 expands the difference data, and outputs and expanded data (FIG. 3D) to adder 11. Adder 11 receives the expanded data read out from memory 9 and the expanded data obtained by second expansion circuit 10, and adds these expanded dtat. Therefore, adder 11 outputs image data corresponding to original image data stored in image memory 1.

According to this embodiment, since original image data is loss-compressed by first compression circuit 2, a data volume can be sufficiently reduced. For example, it is known that an upper limit of a compression ratio by lossless compression is ½ of an original image. According to the present invention, since image data is loss-compressed by the first compression circuit, the image data can be compressed to 1/20 with reasonable image quality. Therefore, even if the difference data is lossless-compressed by second compression circuit 5 to 1/5, an original image can be compressed to ¼. This value varies depending on each original image. However, in any case, a compression ratio of this invention can be improved to be higher than that in a conventional lossless compression technique. For this reason, the storage capacity of a storage device for compressed data can be reduced, and a transfer time of image data can be shortened.

Another embodiment will be described with reference to FIG. 5. According to this embodiment, second compression section 5A is constituted by a plurality of compression units 5-1 to 5-n. Each compression circuit comprises memory 51, compression circuit 52, expansion circuit 53, and difference circuit 54. Memory 51 of compression unit 5-1 is connected to the output terminal of difference circuit 4. The read terminal of memory 51 is connected to compression circuit 52 and the "+" terminal of difference circuit 54. The "−" terminal of difference circuit 54 is connected to the output terminal of expansion circuit 53. Difference circuit 54 of first-stage compression unit 5-1 is connected to memory 51 of second-stage compression unit 5-2. Similarly, difference circuit 54 of the next-stage compression unit is connected to corresponding memory 51 of the still next stage. The output terminals of compression circuits 52 of first to n-th stage compression units 5-1 to 5-n are connected to multiplexer 6a.

Figure 5:
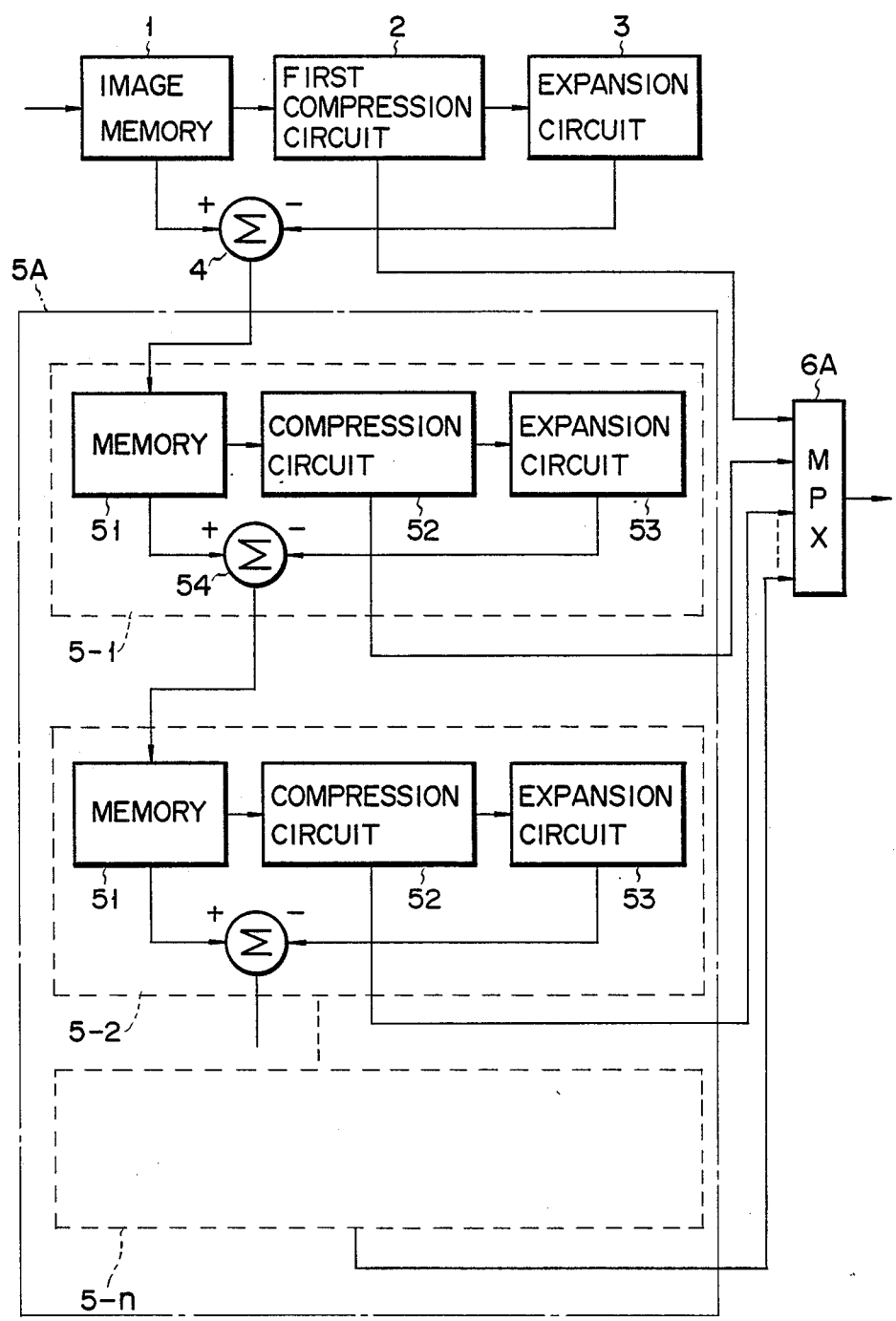
FIG. 5 is a block diagram of an image processing apparatus according to another embodiment of the present invention.

According to the embodiment shown in FIG. 5, difference data obtained by difference circuit 4 is loss-compressed by lossy compression circuit 52 through memory 51 of first-stage compression unit 5-1. The loss-compressed data is expanded by expansion circuit 53. A difference between the expanded data from expansion circuit 53 and the difference data stored in memory 51 is calculated by difference circuit 54. The difference data from difference circuit 54 is stored in memory 51 of second-stage compression unit 5-2. Based on the difference data stored in memory 51, new difference data is similarly calculated. This processing is performed up to last stage compression unit 5-n. The loss-compressed data obtained by lossy compression circuits 52 at the respective stages are multiplexed by multiplexer 6a, and the multiplexed data is output to an external expansion circuit apparatus.

When difference data is hierarchically compressed as described above, the compression ratio can be increased to a desired value in accordance with the number of stages.

In the above embodiment, the entire original image need not be compressed at once. For example, an original image can be divided into a plurality of blocks, and compression processing can be performed in units of blocks. In this way, the storage capacity of the image memory can be reduced, and a wait time in the compression processing can be shortened.

Another embodiment will be described with reference to FIG. 6A. When an image to be compressed is loss-compressed, an image quality of a decoded image is degraded as described above. In this embodiment, an image processing apparatus with the following advantages can be provided. More specifically, difference vectors based on difference data between an original image and a decoded image obtained by expanding the loss-compressed image are quantized, and a decoded image with less degradation can be obtained from the relationship between the quantized outputs of the difference vectors and the loss-compressed image.

Referring to FIG. 6A, the output terminal of lossy compression circuit 22 which receives an original image is connected to expansion circuit (decoder) 23. The output from expansion circuit 23 is connected to difference circuit 24 together with an output from an original image output circuit (e.g., an image memory). The output terminal of difference circuit 24 is connected to vector construction circuit 25.

Vector construction circuit 25 generates difference vectors based on the difference data. The output terminal of circuit 25 is connected to vector quantization circuit 28 of vector quantization section 26. Vector quantization circuit 28 is connected to memory 27 which stores a code book. The code book has codes as sample vectors which are obtained such that a vector space is divided into $2n$ subspaces so that mean square errors of vectors distributed in an n-dimensional space can be minimized, and the centers of subspaces are given as sample vectors. Vector quantization circuit 28 performs vector quantization of m-bit/vector based on the code data read out from the code book.

Multiplexer 29 receives the outputs from lossy compression circuit 22 and quantization section 26, and outputs multiplexed data.

Figure 2:
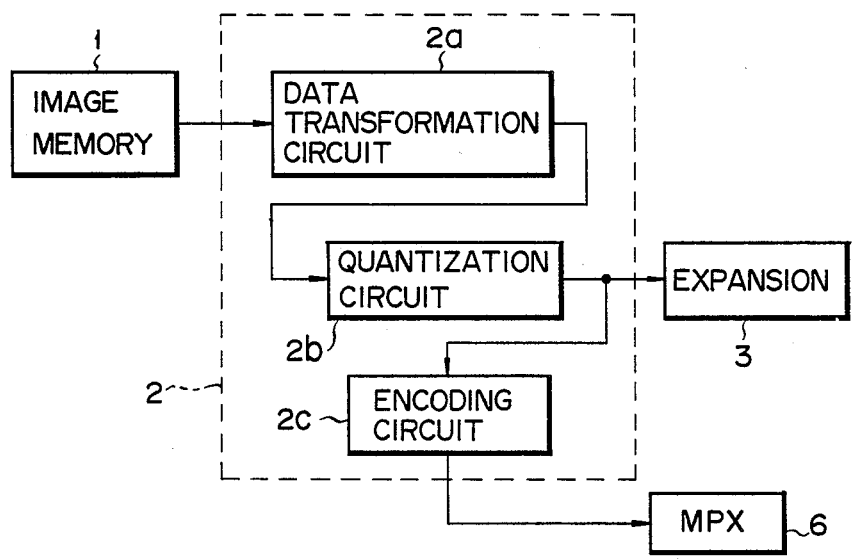
FIG. 2 is a block diagram of the image processing apparatus showing in detail a first compression circuit used in the embodiment shown in FIG. 1.

An original image data is input to lossy compression circuit 22 in the circuit shown in FIG. 6. Circuit 22 has a circuit construction shown in FIG. 2 and loss-compresses the original image data, and respectively outputs quantized data and encoded data to decoder 23 and multiplexer 29. Decoder 23 decodes quantized data through expansion processing. Decoded data is input to difference circuit 24. A difference between the original image data and the decoded data is calculated by circuit 24, and the difference data is input to vector generation circuit 25. Vector generation circuit 25 generates difference vectors based on the difference data. The difference vectors are input to vector quantization circuit 26 and are quantized thereby.

Vector quantized data is multiplexed with the original image data by multiplexer 29, and the multiplexed data is sent to an external apparatus, such as a memory of a destination station. Then, the multiplexed data is decoded by a decoder at the destination.

In the embodiment shown in FIG. 6A, in conventional vector quantization, sample vectors are selected so that mean square errors of vectors are minimized with respect to all vectors (x,y) present in set $\Omega$ of vectors = {(x,y)}. The code book is designed based on the sample vectors. A set of difference image vectors are often concentrated around a vector origin (difference=0), even if a lossy compression is used. In the conventional technique, the sample vectors are concentrated near the vector origin at which a vector concentration is high. However, important difference vectors which improve decoding performance are separated from the vector origin. Therefore, in the conventional vector quantization technique, the important vectors are not used. The vector points which are concentrated around the vector origin are represented by redundant sample vectors. In this embodiment, therefore, unimportant difference vectors which are concentrated near the vector origin are quantized using one difference vector as a sample vector. In contrast to this, sample vectors are individually assigned to important difference vectors, and these important difference vectors are quantized in association with the corresponding sample vectors.

Figure 7A:
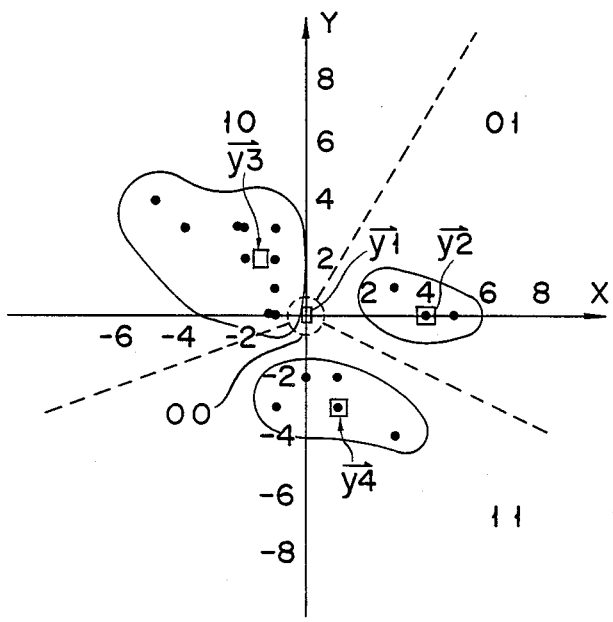
FIG. 7A is a view representing an arrangement of vectors.

For example, a case will be described wherein a set of two-dimensional vectors (x,y) is quantized by 2-bit/vector. The center (vector origin) of the set of vectors is given as (0,0). Four sample vectors $\vec{y1}, \vec{y2}, \vec{y3}$, and $\vec{y4}$ are provided as shown in FIG. 7A. One of these vectors, e.g., sample vector $\vec{y1}$, is set at origin (0,0) or near the origin $(0 \pm \epsilon 1, 0 \pm \epsilon 2)$. Difference vectors $\vec{X}(x,y)$ within a given threshold value (for example, 0.5 times the standard deviation of a frequency distribution of vectors constituted by difference images, i.e., $0.5\delta$) are quantized using sample vector $\vec{y1}$. A space falling outside the threshold value is divided to minimize mean square errors, and sample vectors $\vec{y2}, \vec{y3}$, and $\vec{y4}$ are set at the center of each divided space, e.g., the center of gravity. Each difference vector $\vec{X}(x,y)$ in the space falling outside the threshold value is quantized in association with a sample vector $\vec{yi}$ which can minimize difference $|\vec{X} - \vec{yi}|$ between itself and sample vector $\vec{yi}$ ($i \neq 1$).

Figures 7B, 7C:
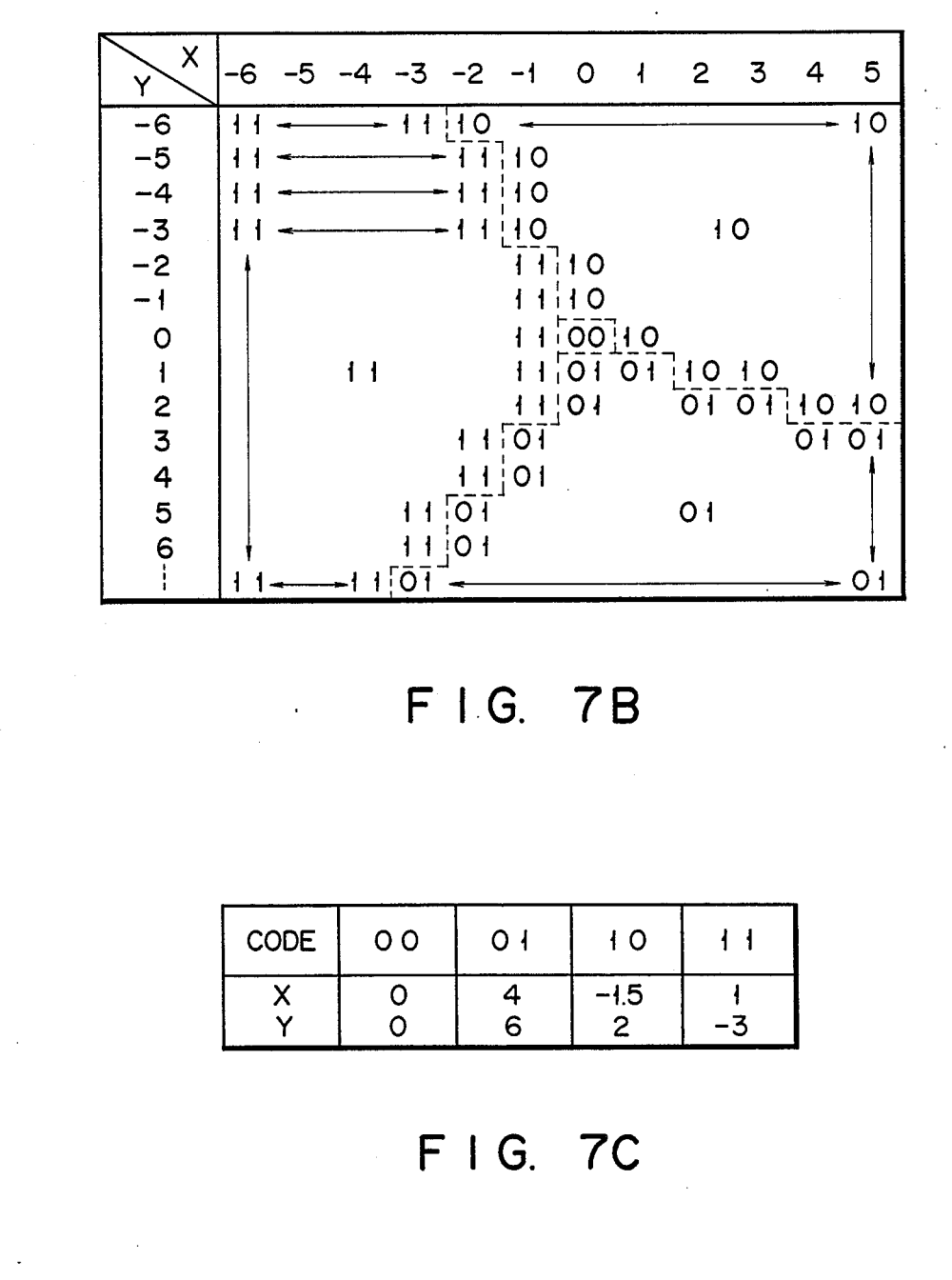

The vector quantization will be described hereinafter in more detail. In difference data shown in FIG. 3D, when the data is projected in 2-dimentional vector space, two adjacent pixels are respectively set as X and Y components. For example, in the difference data, two adjacent pixels, e.g., 0 and 2, $-1$ and 1, $-5$ and 4, and the like, are set as X and Y components, respectively, and these coordinates (X,Y) are plotted on the two-dimensional coordinate system, as shown in FIG. 7A. In accordance with the plot distribution, the space of the two-dimensional coordinate system is divided into 4 regions. A standard vector is set so that a mean square average error of vectors distributed in each region is minimized. Sample vectors are indicated by y1, y2, y3, and y4 in FIG. 7A. A code book shown in FIG. 7B is generated based on the vector plots shown in FIG. 7A. As can be seen from this code book, since the vector space is quantized by 2 bits, codes are four codes, i.e., 00, 01, 10 and 11. These four codes correspond to values X and Y shown in FIG. 7C. Therefore, when data is compressed, an image can be represented by only 2-bit codes. When an original image has an 8-bit configuration, image data of two pixels X and Y, i.e., having a data volume of 16 bits are represented by 2-bit codes, and are compressed to $\frac{1}{8}$.

FIG. 6B shows vector quantization circuit 26. With this circuit, vectors (FIG. 3A) continuously input from vector generating circuit 25 into vector quantization circuit 26 are stored in registers 30 and 31. Data stored in registers 30 and 31 are used as address data for memory 27. Memory 27 stores the code book shown in FIG. 7B. The code book is read-accessed by the address data from registers 30 and 31, and the readout data is output to multiplexer 29.

A case will be described wherein each vector data is quantized to m-bit/vector in an n-dimensional space. Assume that one vector is present in a small space including the center of vector set $\Omega = [\vec{X}:\vec{X}=(x1, x2, \ldots, xn)]$. For example, a value present within a range of $0.2\delta$ from the center (e.g., $0.5\delta$) is determined, an extra-threshold value space is divided so that mean square errors are minimized with respect to a set of vectors falling outside the threshold value, and the remaining sample vectors are set at the centers of the divided spaces.

Figure 6C:
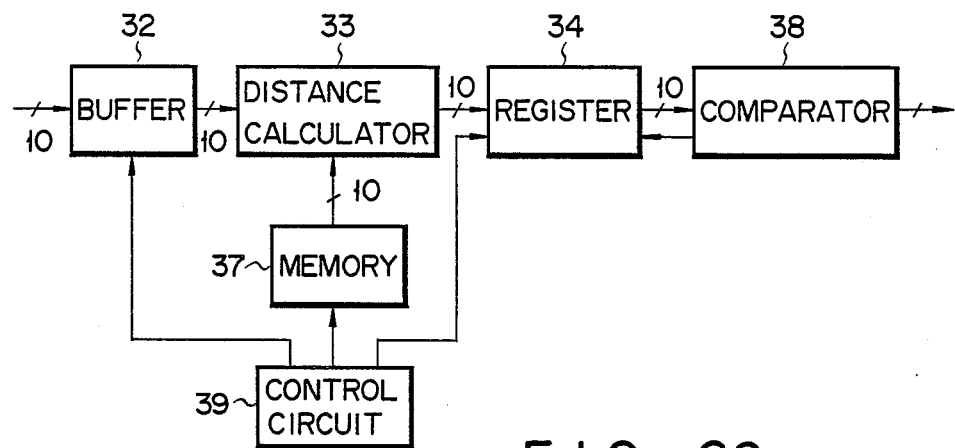
FIG. 6C is a circuit diagram of another vector quantization circuit section used in the embodiment shown in FIG. 6A.

When the above vectors have two or more dimensions as described above, the vectors are quantized by a circuit shown in FIG. 6C. More specifically, vectors continuously input from vector generating circuit 25 are temporarily stored in buffer 32. Vector $X = (x1, x2, \ldots, xn)$ is read out from buffer 32, and a difference between the readout vector and sample vectors y1 to yn, i.e., $|x - yi|$ is calculated by distance calculating circuit 33. Difference data is stored in register 34. The difference data stored in register 34 is input to comparator 38. Comparator 38 compares the difference data to obtain minimum sample vector yi(min), and outputs a code corresponding to minimum sample vector yi(min).

The code book prepared as described above is stored in memory 27, and a corresponding sample vector is read out from memory 27, and an input difference vector is quantized based on the readout sample vector by vector quantization circuit 28. More specifically, it is first determined in vector quantization circuit 28 if difference vector X is present in a space having sample vector $\vec{y1}$ as the center. In other words, it is checked using the code book stored in memory 27 if the difference vector falls within the space inside the predetermined threshold value. If the difference vector falls within the space, circuit 28 quantizes difference vector $\vec{X}$ using sample vector $\vec{y1}$, and outputs vector-quantized data of b(y1) as a binary code. If the difference vector falls outside the space, differences between difference vector $\vec{X}$ and other three sample vectors $\vec{yi}$ (i≠1), i.e., $|\vec{X} - \vec{yi}|$, are calculated. Circuit 28 quantizes the difference vector outside the space using a sample vector which provides a minimum valve among obtained difference vectors $|\vec{X} - \vec{yi}|$.

The quantized data and loss-compressed data from lossy compression circuit 22 are multiplexed by multiplexer 29, and the multiplexed data is output to an external apparatus.

An embodiment shown in FIG. 8 will now be described. In this embodiment, an output from difference circuit 24 is connected to filter 35. Filter 35 is adopted to remove noise components from difference data from difference circuit 24, and comprises a logic filter for removing an independent point. Filter 35 removes the independent point as part of noise to improve an average redundancy and a compression ratio. Note that noise components mean the signal components except for important data as difference data (corresponding to, e.g., a long line, or a plane having a certain area).

The output terminal of filter 35 is connected to run length encoder 36. Run length encoder 36 is adopted to convert continuous identical signal components, e.g., continuous white or black signal components, into one code. The output terminal of encoder 36 is connected to multiplexer 29 together with the output terminal of lossy compression circuit 22.

According to the embodiment shown in FIG. 8, the noise component included in difference data output from difference circuit 24 is removed by filter 35, and the difference data is input to encoder 36. The difference data is encoded by encoder 36, and is input to multiplexer 29 together with loss-compressed data.

According to the embodiment shown in FIG. 8, noise components can be removed from difference data, and thereafter, the difference data is encoded by a run length technique. Therefore, the data can be encoded using a smaller number of bits. When a compressed image output from the multiplexer is decoded, a decoded image with less distortion can be obtained.

Another embodiment will now be described with reference to FIG. 9. In a medical image, a region of interest (ROI) for a doctor, i.e., a diseased portion, is often not distributed in the entire image, but is locally present in the image. An image region other than the diseased portion is observed only to determine the position of the diseased portion in the entire image, and hence, need not have a high image quality. From this point of view, it is effective that only the ROI is lossless-compressed and other non-ROI is loss-compressed. Based on this principle, this embodiment was made.

According to the embodiment shown in FIG. 9, first image memory 61 for storing image data is connected to first compression circuit 63 for loss-compressing an original image. The output terminal of first compression circuit 63 is connected to expansion circuit 64. The output terminal of expansion circuit 64 is connected to second image memory 65.

Address terminals of first and second image memories 61 and 65 are respectively connected to first and second address output circuits 62 and 66. Circuits 62 and 66 respectively output address data to first and second image memories 61 and 65 in accordance with an ROI designation signal from ROI designation unit 68.

The output terminals of first and second image memories 61 and 65 are respectively connected to difference circuit 69. The output terminal of difference circuit 69 is connected to second compression circuit 70 for lossless-compressing difference data. The output terminals of first and second compression circuits 63 and 70 are connected to storage circuit 66. Storage circuit 66 is connected to ROI designation unit 68. Circuit 66 stores the output data from first and second compression circuits 63 and 70, and also stores control data such as a position and size of an ROI, a data length after compression, and the like, as a header.

In the embodiment shown in FIG. 9, an original image read out from first image memory 61 is loss-compressed by first compression circuit 63. Compressed image data is stored in storage circuit 66, and is also input to expansion circuit 64. Image data expanded by expansion circuit 64 is stored in second image memory 65.

ROI a shown in FIG. 11 is designated by ROI designation unit 68. When coordinate data of ROI a is output from unit 68 to first and second address output circuits 62 and 67, circuits 62 and 67 output address data for ROI a. When first and second image memories 61 and 65 are accessed by these address data, original image data and decoded image data which correspond to ROI a are read out from memories 61 and 65 and are input to difference circuit 69. Difference circuit 69 outputs image data corresponding to a difference between these image data to second compression circuit 70. Second compression circuit 70 lossless-compresses the difference data, and stores the compressed data into storage circuit 66. At this time, compressed image data of ROI a is stored in storage circuit 66 together with header data associated with the image data of the ROI. The header data includes control data such as a position and size of the ROI, a data length after compression, and the like.

The compressed image data stored in storage circuit 66 is transmitted to and stored in storage circuit 72 (FIG. 10) through a transmission line. When image data stored in storage circuit 72 is read out to demultiplexer 73, demultiplexer 73 demultiplexes the input image data into three data, i.e., loss-compressed image data, lossless-compressed image data, and control data, and inputs them respectively to first expansion circuit 74, second expansion circuit 75, and control circuit 80.

First expansion circuit 74 expands image data (entire image) loss-compressed by first compression circuit 63. Second expansion circuit 75 expands difference data (data corresponding to ROI a) lossless-compressed by second compression circuit 70. Image data (data corresponding to images a and b in FIG. 12) expanded by first and second expansion circuits 74 and 75 are temporarily stored in first and second buffer memories 76 and 77, respectively.

Control circuit 80 accesses first and second buffer memories 76 and 77 based on the input control data, and reads out and supplies data corresponding to ROI a to multiplexer 78. Multiplexer 78 multiplexes the image data corresponding to ROI a and difference data, and outputs the multiplexed data to image memory 79.

According to this embodiment, when an ROI is lossless-compressed and a region other than the ROI is loss-compressed, a compression ratio of an entire image can be increased.

Figure 13:
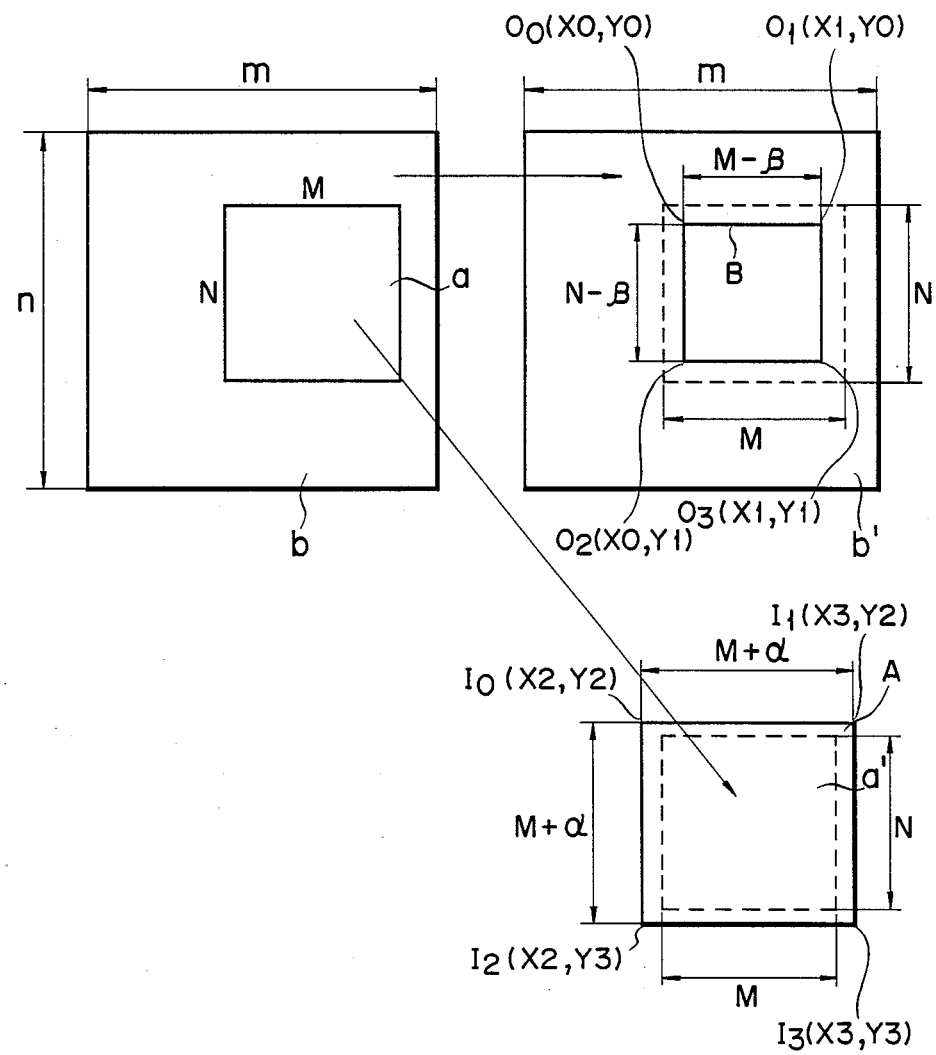
FIG. 13 is a view showing patterns for dividing an original image into lossless- and loss-compressed images having a superimposed region.

In this embodiment, an artifact may occur in a portion corresponding to a boundary between ROI a and other region b. An embodiment for preventing the artifact will be described below. As shown in FIG. 13, first region a' of $(M+\alpha)\times(N+\alpha)$ including $M\times N$ ROI a and region b' including region b are extracted from an original image. These regions a, and b' are respectively lossless- and loss-compressed. In this case, $\alpha$ and $\beta$ in FIG. 13 need not be positive values, and at least one of these values need be a positive value. In this case, $\alpha \geq 0$ and $\beta \geq 0$. This means that pixels commonly occupied by regions a and b can belong to a boundary region.

When compressed data is expanded, it is lossless- or loss-expanded so as to obtain regions a, and b'. Regions a' and b' obtained by expansion are multiplexed, and then, an overlapping portion can be interpolated. In this manner, data at the boundary between regions a and b smoothly changes, and no artifact occurs at the boundary.

FIG. 14 shows a circuit for realizing image processing shown in FIG. 13. Image memory 81 can store an original image of $n\times m\times 1$ bits. Image memory 81 is address-designated by first address circuit 84, and its readout output is connected to first and second compression circuits 87 and 88 through demultiplexer 86. First compression circuit 87 lossless-compresses image data of first region a', and second compression circuit 88 loss-compresses image data of region b'.

First address circuit 84 determines a region having a predetermined width [a region of $(M+\alpha)\times(N+\alpha)-(M-\alpha)\times(N-\beta)$ in FIG. 13] including a boundary line of ROI a designated by ROI designation unit 82 to be an overlapping region, and thus designates addresses of first region a' inside outer boundary line A of the overlapping region, i.e., a region of $(M+\alpha)\times(N+\alpha)$ and of second region b' outside inner boundary line B of the overlapping region, i.e., a region of $(m\times n)-(M-\beta)\times(N-\beta)$.

Address designation by means of first address circuit 84 will be described in more detail. When data put from ROI designation circuit 82 to control circuit 92, circuit 92 outputs boundary data between two regions to first address circuit 84. More specifically, four coordinates corresponding to an outer boundary, i.e., O0(X0,Y0), O1(X1,Y0), O2(X0,Y1), and O3(X1,Y1), and coordinates corresponding to an inner boundary, i.e., I0(X2,Y2), I1(X3,Y2), I2(X2,Y3), and I3(X3,Y3) are input to first address circuit 84. Upon reception of these coordinate data, first address circuit 84 outputs the following address data.

When an address of the outer boundary is designated:
(1) If $0 \leq Y \leq Y0$, address data where X is increased from 0 up to m−1 is generated.
(2) If $Y0+1Y \leq Y1-1$, address data where X is increased from 0 to X0, skips to X, and is then increased up to m−1 is generated.
(3) If $Y1 \leq Y0m-1$, address data where X is increased from 0 to m−1 is generated.

When an address data of the inner boundary is designated:
(1) If $0 \leq Y \leq Y2-1$, no address data is generated.
(2) If $Y2 \leq Y \leq Y3$, address data where X changes from X2 to X3 is generated.
(3) If $Y3+1 \leq Y \leq m-1$, no address data is generated.

The output terminals of first and second compression circuits 87 and 88 are connected to storage circuit through multiplexer 89. Storage circuit 91 is address-designated by address data from second address circuit 90. Control circuit 92 controls demultiplexer 86, first and second address circuits 84 and 90, first and second compression circuits 87 and 88, and multiplexer 89 in accordance with the designated region data from ROI designation unit 82.

Image processing is performed in two systems by a circuit shown in FIG. 14. In first-system image processing, first address circuit 84 outputs addresses of pixels corresponding to region a' including ROI a, image data of first region a' is read out from memory 81, and the readout data is input to first compression circuit 87 through demultiplexer 86. Image data (region a') which is lossless-compressed by first (lossless) compression circuit 87 is stored in storage circuit 91 through multiplexer 89. A write address in this case is output from second address circuit 90.

In second-system image processing, addresses of pixels corresponding to second region b' are output from first address circuit 84, and image data of region b' is input to second compression circuit 88 through demultiplexer 86. Image data (region b') which is loss-compressed by second (lossy) compression circuit 88 is stored in storage circuit 91 through multiplexer 89. A write address at this time is output from second address circuit 90.

Image data is stored in storage circuit 91 in the format shown in FIG. 15. In this format, header data includes a header word length and control data associated with first compression (lossless compression) and second compression (lossy compression), such as position, size, scheme, number of words, word length, and the like.

Figure 16:
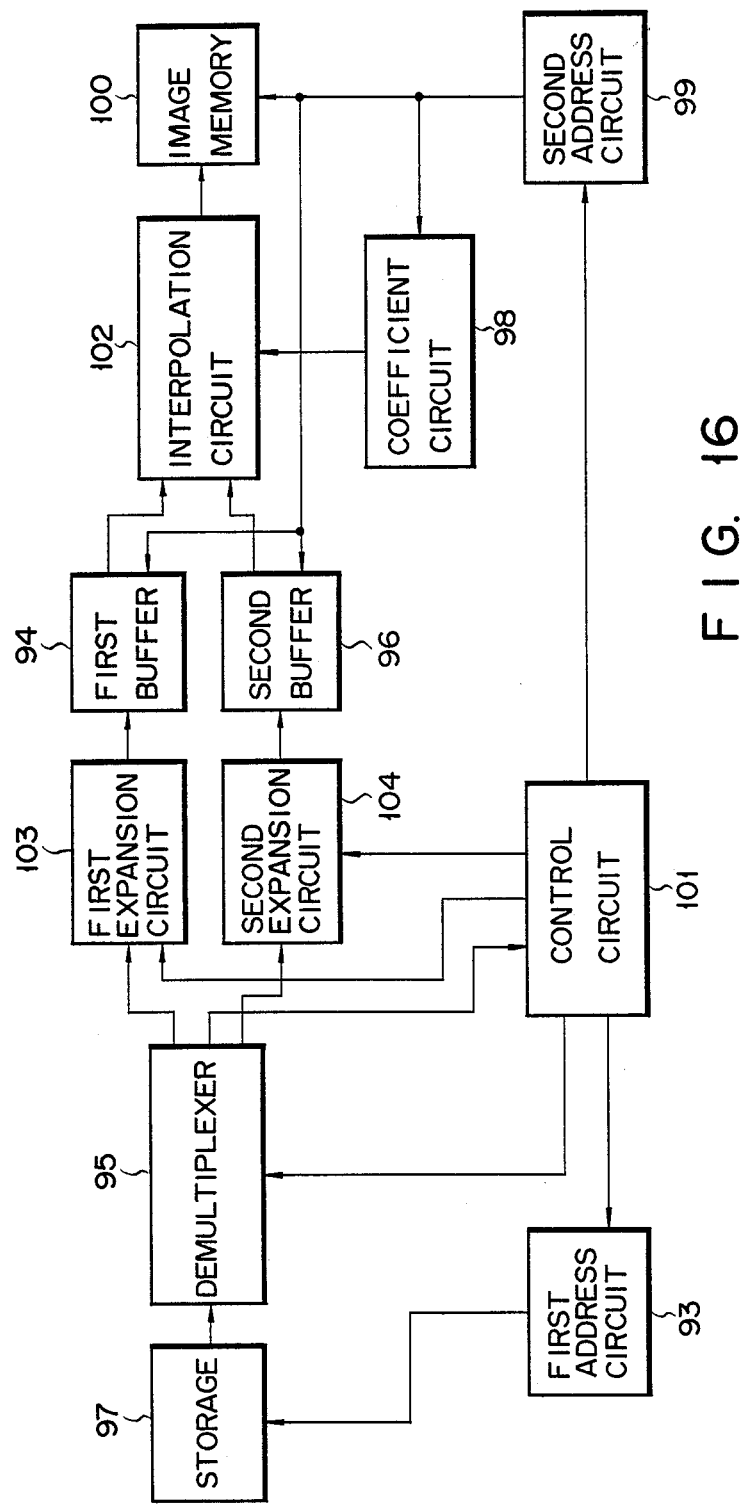
FIG. 16 is a block diagram of an image expansion processor used in the embodiment shown in FIG. 14.

First and second compressed image data stored in storage circuit 91 are transmitted to storage circuit 97 at the receiver side shown in FIG. 16 through a transmission path (not shown), and are stored therein. A read output terminal of storage circuit 97 is connected to first and second expansion circuits 103 and 104 and control circuit 101 through demultiplexer 95. First and second expansion circuits 103 and 104 respectively expand the lossless-compressed image data and the loss-compressed image data, and respectively output expanded image data to interpolation circuit 102 through first and second buffer memories 94 and 96.

Interpolation circuit 102 interpolates image data corresponding to an overlapping region in accordance with an interpolation coefficient output from coefficient generator 98, and outputs the interpolated data to image memory 100. An interpolation calculation will be described later.

Storage circuit 97 and image memory 100 are respectively address-designated by address data from first and second address circuits 93 and 99, so as to perform read/write access of image data.

Figure 17:
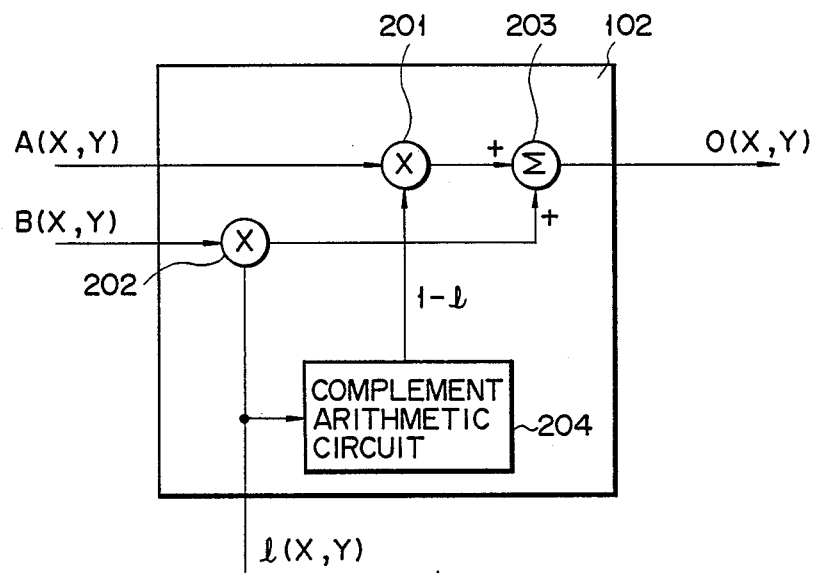
FIG. 17 is a circuit diagram of an interpolator shown in FIG. 16.

FIG. 17 shows interpolation circuit 102. The interpolation operation will now be described with reference to FIG. 16. Circuit 102 comprises multipliers 201 and 202, integrator 203, and complementary number operation circuit 204. Output data from first and second buffer memories 94 and 96 are input to multipliers 201 and 202. Circuit 104 fetches interpolation coefficient l(X,Y) output from coefficient generator 98, calculates (1−l), and outputs the result. Multiplier 201 multiplies expanded data A(X,Y) fetched from first buffer memory 94 with output (1−l) from circuit 204. Multiplier 202 multiplies expanded data B(X,Y) fetched from second buffer memory 96 with output l(X,Y) from coefficient generator 98.

Integrator 203 integrates outputs from multipliers 201 and 202, and outputs integrated output O(X,Y) to image memory 100. Integrated output O(X,Y) can be obtained from the following equation;

$$O(X,Y)=l(X,Y)\cdot B(X,Y)+(1-l(X,Y))\cdot A(X,Y)$$

The operation of the circuit shown in FIG. 16 will be described with reference to the flow chart shown in FIG. 18. Header data is read out from storage circuit 97 based on the address data from first address circuit 93, and readout data is input to control circuit 101 through multiplexer 95.

When an address for first compressed image data is designated by the address data from the first address circuit, the first compressed image data is read out from storage circuit 97. The first compressed image data is input to first expansion circuit 103 through demultiplexer 95, and is subjected to expansion processing. Expanded image data from circuit 103 is temporarily stored in first buffer memory 94.

When an address for second compressed image data is designated by the first address circuit, storage circuit 97 outputs second compressed image data. The second compressed image data is input to second expansion circuit 104 through demultiplexer 95, and is subjected to expansion processing. The expanded image data from circuit 104 is temporarily stored in second buffer memory 96.

The expanded data are read out from first and second buffer memories 94 and 96, and are input to interpolation circuit 102. Circuit 102 executes the above-mentioned interpolation calculation with respect to the overlapping region. First, $\beta$ of region (M−$\beta$) shown in FIG. 13 is set to be 0. In this case, a region indicated by cross-hatched lines (FIG. 19) is an overlapping region, and the overlapping region is subjected to interpolation processing. Assume that the interpolation processing is executed for an image along line L (FIG. 20). In this case, in the profile of the image along line L, the profile corresponding to region a' is indicated in FIG. 21A. The profile corresponding to region b' is indicated in FIG. 22A. The waveform of interpolation coefficient l(X,Y) is indicated in FIG. 21B, and interplation coefficient (1−l) is indicated in FIG. 22B.

When image profiles shown in FIGS. 21A and 22A are respectively multiplied with interpolation coefficient l(X,Y) and (1−l), patterns shown in FIGS. 21C and 22C are obtained. When these patterns are added, pattern shown in FIG. 22D is obtained. More specifically, the overlapping region is interpolated, so that a data string (corresponding to pixels along line L in FIG. 20) intersecting a boundary of the ROI can smoothly change. As a result, a decoded image can be free from artifacts.

Note that interpolation coefficient waveforms shown in FIGS. 21B and 22B are linearly changed, but can be changed quadratically.

In the above embodiment, an ROI is lossless-compressd, a region other than the ROI is loss-compressed, and a boundary portion therebetween is interpolated. Thus, a high image quality in the ROI can be maintained, a compression ratio of an entire image can be improved, and generation of artifacts can be prevented.

What is claimed is:

1. An image data processing apparatus comprising:
image output means for outputting image data;
first compression means, for loss-compressing the image data from said image output means;
image data expansion means for expanding the image data compressed by said first compression means, to output expanded image data;
difference means, connected to said image data output means and said image data expansion means, for calculating a difference between the image data of said image output means and the expanded image data, and outputting difference image data;

second compression means, for compressing the difference image data output from said difference means; and multiplexing means, connected to said first and second compression means, for multiplexing the loss-compressed image data and compressed difference image data; and wherein said first compression means comprises transformation means for orthogonal-transforming the image output from said image data output means, quantization means for quantizing the output of said transformation means and outputting the quantized data to said expansion means, and encoding means for encoding the quantized data of said quantization means and outputting encoded data to said multiplexing means.

2. An apparatus according to claim 1, wherein said second compression means comprises means for lossless-compressing the difference data.

3. An apparatus according to claim 1, wherein said second compression means has a plurality of stages of compression circuit units including a compression circuit unit of a first stage connected to the output of said difference means, the compression circuit unit of each stage having a memory, a lossy compression circuit for loss-compressing data stored in said memory and outputting the loss-compressed data, an expansion circuit for expanding the output of said lossy compression circuit, and difference means for calculating a difference between the expanded output of said expansion circuit and image data stored in said memory, and outputting difference data to the memory of the compression circuit unit of the next stage, and said multiplexing means being a circuit for multiplexing the output data of said first compression means and the outputs of said lossy compression circuits of said plurality of stages of compression circuit units.

4. An apparatus according to claim 1, further comprising: means for demultiplexing the multiplexed image data obtained from said multiplexing means into loss-compressed image data and difference image data; image data expansion means for respectively expanding the loss-compressed image data and difference image data obtained from said demultiplexing means, and outputting first and second expanded data; and addition means for adding the first and second expanded data output from said image data expansion means, and outputting decoded image data.

5. An apparatus according to claim 1, wherein said second compression means includes means for generating vector data from the difference data, and means for quantizing the vector data output from said vector generation means, said multiplexing means comprising means for multiplexing the output of said first compression means and the output of said vector quantization means.

6. An apparatus according to claim 5, wherein said vector quantization means has memory means for storing sample vectors, and a vector quantization circuit for quantizing vector data output from said vector generation means, based on the sample vector read out from said memory means.

7. An apparatus according to claim 6, wherein said vector quantization circuit comprises means for quantizing a plurality of vectors present in a predetermined range from a center of a vector space, using a single sample vector, and for quantizing vector data outside the predetermined range, using a corresponding sample vector.

8. An apparatus according to claim 1, wherein said second compression means includes filter means for removing a noise component from the difference data output from said difference means, and means for lossless-compressing the output data of said filter means.

9. An apparatus according to claim 8, wherein said lossless compression means comprises run length encoding means.

10. An apparatus according to claim 1, wherein said difference means comprises means for extracting data corresponding to a region of interest, from expanded data output from said expansion means, and a difference circuit for calculating a difference between the expanded data corresponding to the region of interest, extracted by said extraction means, and the image data output from said image data output means, and outputting difference data to said second compression means.

11. An apparatus according to claim 10, wherein said extraction means includes storage means for storing expanded data from said expansion means, and address means for outputting address data corresponding to the region of interest to said storage means, in order to read out the expanded data corresponding to the region of interest.

12. An image data processing apparatus comprising:
image memory means for storing image data;
address means for selectively outputting, to said image memory means, first address data corresponding to a region of interest, so as to read out, from said image memory means, image data corresponding to the region of interest, and second address data corresponding to a region other than the region of interest, so as to read out image data corresponding to a region other than the region of interest;
first compression means for lossless-compressing the image data corresponding to the region of interest, read out from said image memory means by said address means;
second compression means for loss-compressing the image data corresponding to the region other than the region of interest, read out from said image memory means by said address means; and
storage means for storing compressed data obtained by said first and second compression means; and wherein
said address means outputs first and second address data for reading out, from said image memory means, image data including an overlapping region of the region of interest and the region other than the region of interest.

13. An apparatus according to claim 12, further comprising first and second expansion means for respectively expanding image data corresponding to the region of interest and image data corresponding to the region other than the region of interest, read out from said storage means, and interpolation means for interpolating image data corresponding to the overlapping region between the region of interest and the region other than the region of interest, obtained by said first and second expansion means.

14. An image data processing apparatus comprising:
image output means for outputting image data;
first compression means, for loss-compressing the image data from said image output means;

first expanding means for expanding the image data compressed by said first compression means, to output expanded image data;

first difference mean, connected to said image data output means and said first expanding means, for calculating a difference between the image data of said image output means and the expanded image data, and outputting first difference image data;

second compression means, for compressing the first difference image data output from said first difference means, to output compressed difference data;

second expanding means, for expanding the compressed difference data, to output expanded difference data;

second difference means, connected to said first difference means and said second expanding means, for calculating a difference between the difference data of said first difference means and the expanded difference data of said second expanding means, and outputting second difference image data to succeeding compression means and difference means; and multiplexing means, connected to said first and second compression means and said succeeding compression means, for multiplexing the loss-compressed image data and the compressed difference image data.

15. An image data processing apparatus according to claim 14, wherein each of said compression means comprises transformation means for orthogonal-transforming the image data or the difference data, quantization means for quantizing the output of said transformation means and outputting the quantized data to said expansion means, and encoding means for encoding the quantized data of said quantization means and outputting encoded data to said multiplexing means.

* * * * *